T. WILES.
MACHINE FOR STUFFING COLLARS AND OTHER PURPOSES.
No 3,964. Patented Mar. 21, 1845.
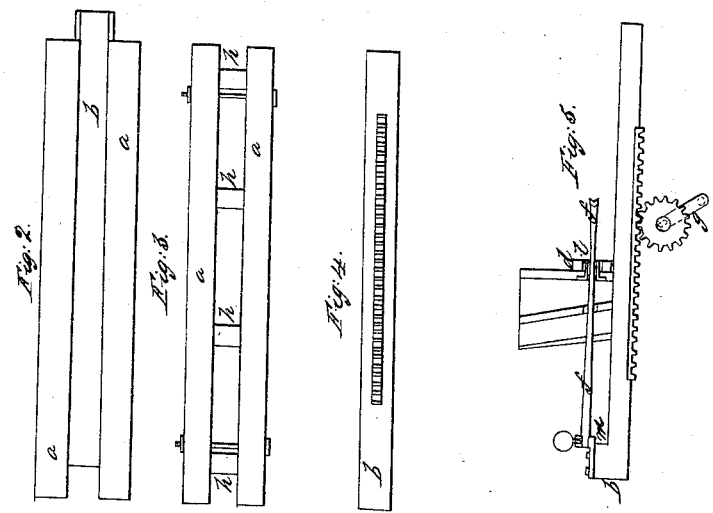
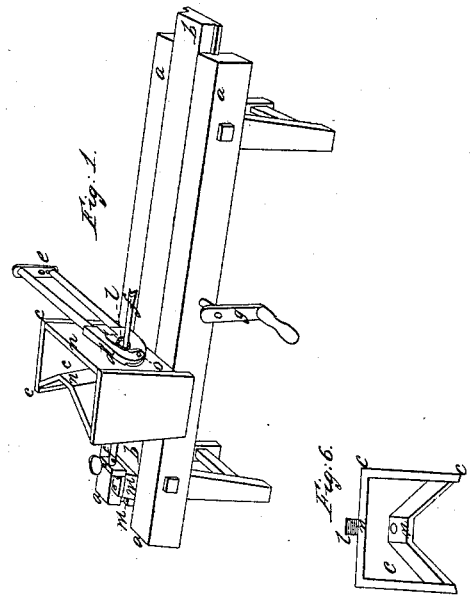

UNITED STATES PATENT OFFICE.

THOMAS WILES, OF SOMERSET, OHIO.

MACHINE FOR STUFFING HORSE-COLLARS.

Specification of Letters Patent No. 3,964, dated March 21, 1845.

*To all whom it may concern:*

Be it known that I, THOMAS WILES, of the town of Somerset, in the county of Perry and State of Ohio, have invented a new and useful improvement in the mechanic arts, being a Machine for Stuffing Collars and for other Purposes, described as follows:

Figure 1, is a perspective view of the machine.

$a, a, a, a$, are the two main beams of the machine, 72 inches in length, 4 inches each, over the top, and each 6 inches thick.

$b, b$, is the slide between the two beams, on which is fastened the iron rod or stuffer $f$, which is 37 inches long. This slide works in, and between the two beams by tongues, as shown in Fig. 2, which extend, on each side of the slide the whole length, working in grooves cut in the beams about one inch deep and one inch broad. The slide is 3 inches thick, having its top face 3 inches broad and its lower face or bottom including the tongues, 6 inches broad. In the bottom of this slide are fastened castings with cogs, as shown by Fig. 4, to receive the cogs of a trunnel head or small cog wheel, (see Fig. 5).

$c$ is a box or hopper to hold the straw; it is 14 inches in length across the beams, and 12 inches high. Its width at both ends from $c$ to $c$ at the top is 9 inches each. Its central width from $n$ to $n$ at the top is 5 inches, and but two inches central width at the bottom. These measurements of the hopper are all inside distances. The bottom of the hopper, except the front board thereof, is about 2 inches above the machine as shown in Fig. 5. The hopper is made of one inch stuff except the front which is 2 inch stuff.

$d$ is a pair of tongs or clamps made of iron, and fastened to the hopper at $o$, on the outside of the front of the hopper by a pin or bolt through the joint so as to work freely to enclamp a tube of iron $l$ (through which the rod $f$ protrudes) serrated or roughened on the outside for the purpose of holding the collar or leather to be stuffed. Through this tube $l$ is forced the straw by the rod $f$ which is forked at the end to catch the straw when placed in the hopper. $e$ is a piece of iron hung to the upper leg or arm of the tongs with holes in it to receive the lower leg or arm, so as to fasten the tongs upon the tube when the leather is around it. This tube is three inches long, containing about a ⅝ bore or hole through it.

$g$ is a crank fastened to the axle of the cast cog wheel, placed below the slide, so as to work in the rack or castings of cogs fastened in the bottom, or lower face of the slide $b, b$, as shown in Fig. 5 for the purpose of driving the rod $f$ in stuffing collars. The nut or block, on the end of the slide that holds the rod is 4½ inches long, and three inches high. This nut or block is fastened to the slide by two iron bolts, passing through the slide, the nut and an iron on the top, with a raised head, and then with screw taps all three fastened firmly together as shown at $m$, in Fig. 5. The iron as fastened on the top of the nut receives by a square hole in its raised head, the squared end of the rod $f$ and firmly fastened there by a thumb screw on the top of the raised head, as is also shown at $m$ in Fig. 5.

From the lower part of the beams $a, a, a, a$, to the floor, the legs measure 30 inches. Figs. 2, 3, 4, 5, are sectional drawings of the machine, of which Fig. 2, is a representation of the two beams $a, a, a, a$, showing how the slide $b, b$, works between them. Fig. 3 shows how the two beams are framed together below the slide, by the cross beams $h, h, h, h$, and an iron rod at or near each end. These rods are made with round heads, on one end and a screw cut on the other, and pass through the legs and both the beams, after the legs are framed into the beams, and screwed together on the opposite side, so as to keep the frame firm.

Fig. 4, is a representation of the lower face of the slide, containing the castings into which the cogs of the trundle head work. Fig. 5 is a side view of the slide, showing how the cog wheel works in the castings, and the position of the nut $m$, and the rod $f$, and of the central construction of the hopper, and how the rod $f$ protrudes through the tube at $l$. The hopper is not fastened upon the slide—the slide being lower than the face of the beams by half an inch. But it is fastened by wood screws to the outside of each of the beams.

The shape of the hopper is described as follows: Its front and ends are rectangular and perpendicular. Its back about ½ its length—is parallel with the front but inclined back from the bottom at about 80 degrees from whose ends the back is extended obliquely to the right and left at the same angle of inclination until it intersects the rear extremities of the ends of the hopper, making the back the shape that the straw would assume when bent by the driver in pushing it through the tube as represented in Fig. 6—which is a plan of the hopper—and serrated tube $l$.

Operation: The edges of the piece of leather intended for the collar being sewed together one end of it is brought over the end of the tube $l$—in a horizontal position—the arms $d\ d$ of the clamp are then brought or closed toward each other around the leather on the tube and are held firmly together by the link or perforated plate $e$ by which the leather is prevented from being forced from the tube during the operation of stuffing the straw through the tube into the leather. The straw to be stuffed or pushed into the leather collar is then placed in the hopper $c$ against the inside thereof horizontally and transversely across the inner end of the tube $l$. The crank $g$ is turned to the right which carries forward the slide or carriage $b\ b$ and stuffer $f$ attached thereto—the forked end of said stuffer catching the straw and gathering it together at the middle and forcing it through the tube $l$ into the collar in a folded position produced by coming in contact with the inside of the tube in which position it is conveyed and stuffed into the collar as far as the middle or smaller diameter thereof,—the obtuse angled shape of the back of the hopper as shown in the plan Fig. 6 allowing the ends of the straw to recede from the front of the hopper while being folded at the middle in passing through the tube. The motion of the crank $g$ is then reversed which brings back the slide and forked stuffer and when the forked end of the stuffer is perpendicularly under the inclined angular back of the hopper a fresh supply of straw is introduced to the hopper and stuffed into the collar in the same manner as that above described by again turning the crank to the right. In this manner the operation is repeated until the one half of the collar be properly stuffed. The link $e$ is then removed—the clamp opened and the collar withdrawn from the tube and the opposite end put over the tube—the clamp closed and secured by the link. This half of the collar is then stuffed in the same manner as the other half was stuffed as above described—evenly and regularly without knots or uneven bunches of different degrees of hardness as in hand stuffing—and in a very expeditious manner.

What I claim as my invention and which I desire to secure by Letters Patent is—

The combination of the horizontal sliding forked stuffer $f$ and tube $l$ and clamp $d$ with the hopper $c$ constructed and arranged in the manner and for the purpose set forth, or other mode substantially the same, by which analogous results are produced.

THOS. WILES.

Witnesses:
Wm. P. Elliot,
A. E. H. Johnson.